W. N. THURMAN.
DRIVE GEAR FOR MECHANICALLY PROPELLED VEHICLES.
APPLICATION FILED NOV. 19, 1908.

935,707.

Patented Oct. 5, 1909.

2 SHEETS—SHEET 1.

Witnesses

Inventor
William N. Thurman
By Attorneys

W. N. THURMAN.
DRIVE GEAR FOR MECHANICALLY PROPELLED VEHICLES.
APPLICATION FILED NOV. 19, 1908.
935,707.
Patented Oct. 5, 1909.
2 SHEETS—SHEET 2.
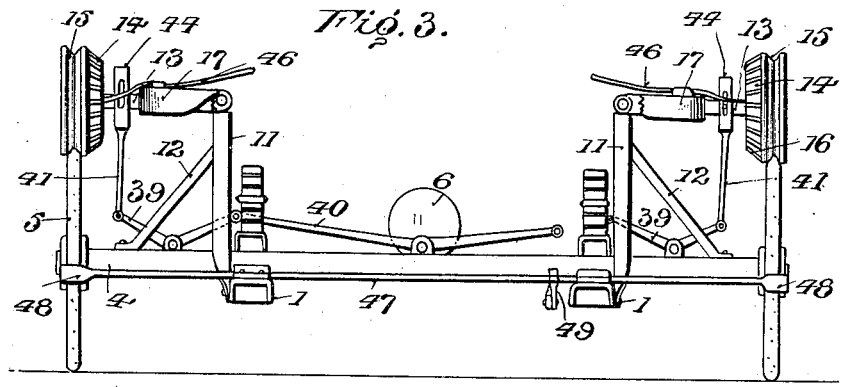
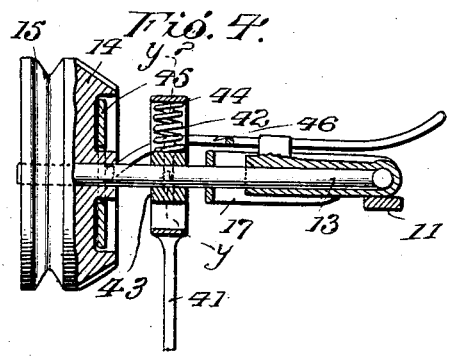
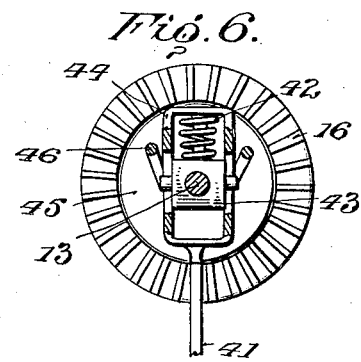
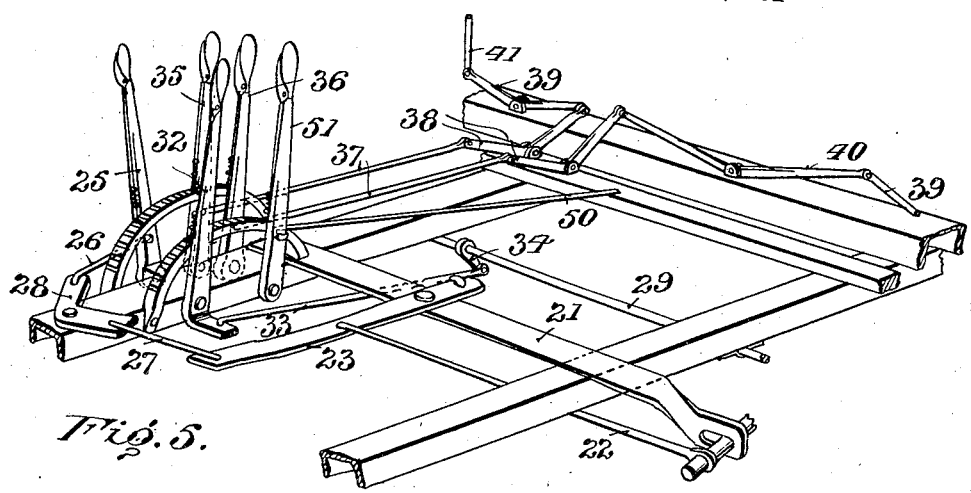
Inventor
William N. Thurman

# UNITED STATES PATENT OFFICE.

WILLIAM N. THURMAN, OF SPRINGFIELD, MISSOURI.

DRIVE-GEAR FOR MECHANICALLY-PROPELLED VEHICLES.

935,707.

Specification of Letters Patent.

Patented Oct. 5, 1909.

Application filed November 19, 1908. Serial No. 463,426.

*To all whom it may concern:*

Be it known that I, WILLIAM N. THURMAN, a citizen of the United States, residing at Springfield, in the county of Greene and State of Missouri, have invented certain new and useful Improvements in Drive-Gear for Mechanically-Propelled Vehicles, of which the following is a specification.

The present invention provides a novel transmission for vehicles driven by motive power and is designed to supply a peculiar gearing which will admit of the power being applied to the rim of the grooved wheels utilized as drivers.

Figure 1:
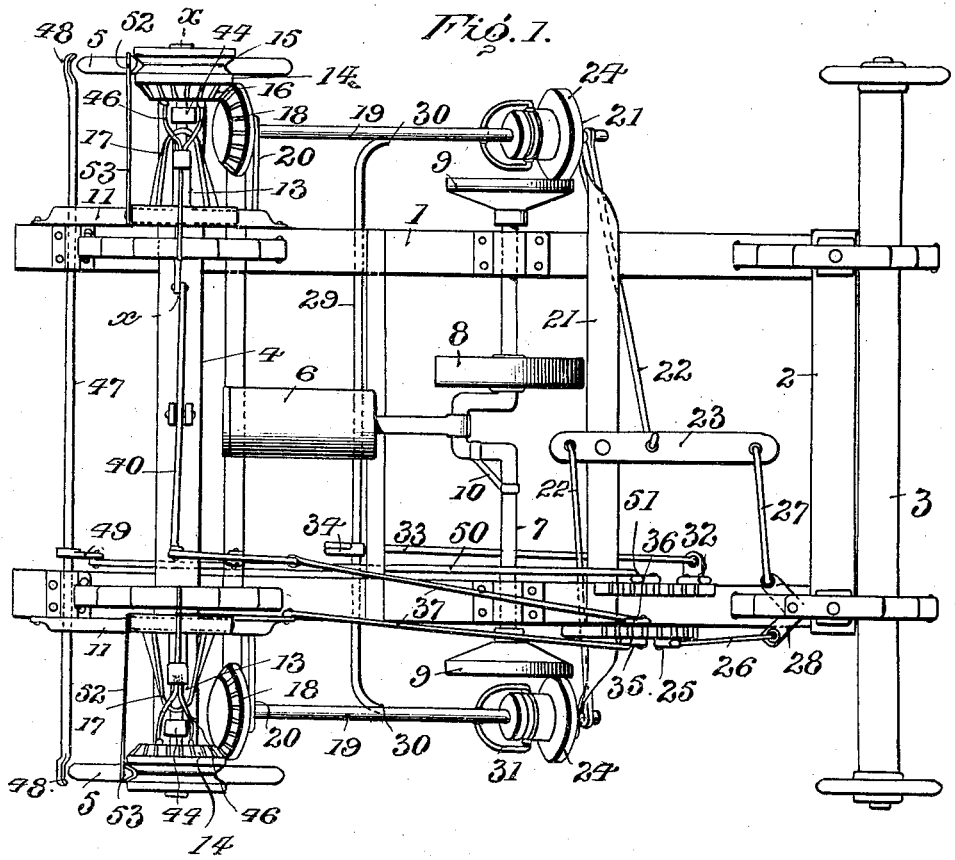
Figure 2:
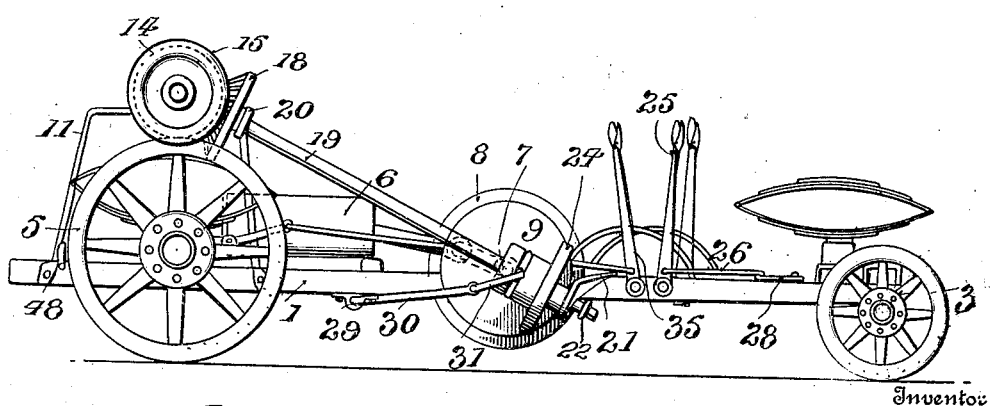

For a full understanding of the invention and the merits thereof and also to acquire a knowledge of the details of construction and the means for effecting the result, reference is to be had to the following description and accompanying drawings, in which:

Figure 1 is a top plan view of the running gear of a mechanically propelled vehicle provided with power transmission constructed in accordance with and embodying the invention; Fig. 2 is a side view thereof; Fig. 3 is a rear view; Fig. 4 is a sectional view on the line $x$—$x$ of Fig. 1; Fig. 5 is a detail perspective view of a part of the main frame showing the levers and the connecting means for operating the axles upon which the friction drive gears are mounted; and, Fig. 6 is a section on the line $y$—$y$ of Fig. 4.

Corresponding and like parts are referred to in the following description and indicated in all the views of the drawings by the same reference characters.

The frame work of the running gear comprises longitudinal bars 1, cross bars 2, a front axle 3, and a rear axle 4. The rear wheels 5 are utilized as drivers and are mounted upon the arms or spindles of the axle 4 in any desired way, so as to turn loosely thereon. A motor 6 may be of any type generally employed for driving road machines and may be conveniently located according to the style of the machine, so as to secure the best results. The crank shaft 7 is mounted in bearings applied to the longitudinal bars 1 and is supplied with a balance wheel 8 intermediate of its ends, and with friction wheels 9 at its ends. The crank portion of the crank shaft 7 is stayed by braces 10, thereby enabling the crank shaft to withstand end pressure without straining the crank portion thereof.

An arch 11 is provided near the rear end of each longitudinal bar 1 and extends vertically and lengthwise of the bar and is stayed at its upper end by means of a brace 12. An axle 13 of approximately T form is pivotally mounted by means of its cross head upon the upper end of each arch and extends outward and is provided at its outer end with a compound gear wheel 14, the same being loose upon the axle and having a groove 15 to receive the rim of the coöperating wheel 5, and having cog teeth 16. The groove 15 is approximately of V form in cross section, so as to engage the rim of the wheel 5 by a wedge action and prevent slipping. A brace 17 forms a stay for the outer portion of the T axle 13.

The tooth portion 16 of the gear wheel 14 normally meshes with a gear wheel 18 fast to the upper end of a longitudinal shaft 19. The upper end of each shaft 19 is mounted in an arm 20 projected outward from the adjacent arch 11, while the lower end of each shaft 19 passes through a slot in a cross bar 21, secured to the longitudinal bars 1, for connection with a bar 22 extending outwardly from a longitudinal lever 23, the latter being pivotally mounted upon the cross bar 21 as best shown in Fig. 5 of the drawings. A friction gear 24 feathered to the lower portion of each longitudinal shaft 19 is adapted to mesh with the friction wheel 9 and is adjusted on the shaft 19 to vary its point of contact with the friction wheel 9 from the center of the latter according to power or speed to be obtained to meet existing requirements. The lower end of each shaft 19 is movable laterally to throw the friction gear 24 into and out of engagement with the friction wheel 9. Both shafts 19 are operated simultaneously by means of the lever 23, the latter having connection with a hand lever 25 conveniently positioned, so as to be readily reached by the operator.

The hand lever 25 is adapted to be secured in an adjusted position by the usual hand operated latch and toothed bar and is connected to the lever 23 by means of rods 26 and 27 and a bell-crank 28. Upon moving the hand lever 25, the longitudinal lever 23 is turned upon its pivoted connection with the cross bar 21 and moves the shafts 19 either to throw the gear wheels 18 out of or into a frictional engagement with the wheels 9. The friction gear wheels 24 are movable on the shafts 19 by means of a shaft 29 arranged transversely of the machine and having arms 30 at its outer ends, which are connected by forks 31 to the grooved hubs of the friction gear wheels 24. A hand lever 32 mounted upon the frame within convenient reach of the operator's seat is connected by a rod 33 and an arm 34 projected from the shaft 29. The hand lever 32 is adapted to be secured in the located position by means of a latch and toothed bar in the well known manner. Upon operating the hand lever 32, the shaft 29 is turned in its bearings and, by means of the arms 30 and forks 31, moves the friction gear wheels 24 upon the shafts 19 to a position nearer to or farther from the axis of the crank shaft 7, so as to obtain power or speed, as may be required.

Each T axle 13 is adapted to be operated independently to throw the gear wheel 14 mounted thereon into and out of engagement with the coöperating drive wheel 5. The connections are similar although their arrangement and proportions vary slightly in adapting the same for convenience. The hand lever 35 is connected with the right hand axle 13, whereas the left hand lever 36 is connected with the axle 13 on the left hand side of the machine. The connections between the levers 35 and 36 and the axles 13 consist of rods 37, bell-cranks 38, 39 and 40 and rods 41. Each of the levers 35 and 36 is adapted to be held in an adjusted position by the usual latch bolt and toothed bar or segment. The upper ends of the rods 41 have yielding or spring connection with the axles 13 to admit of the latter and the gear wheels 14 moving to compensate for any irregularities in the rim of the drive wheels 5, thereby obviating binding, and at the same time insuring a uniform frictional engagement between the gear wheels 14 and the drive wheels 5, which is essential to insure a steady movement.

Any suitable means may be employed for applying the tension of the springs 42 to the axles 13 and for convenience a bearing 43 surrounds each axle 13 and is provided with lateral pins or extensions, which are engaged by the side members of a frame 44 connected to the upper end of each rod 41. The springs 42 are interposed between the upper cross bars of the frame 44 and the bearings 43. This arrangement admits of the axles 13 having a limited movement, while at the same time it insures engagement of the gear wheels 14 with the drive wheels 5. Each gear wheel 14 is provided with a brake, the same consisting of a disk 45 mounted loosely upon the axle 13 and adapted to be operated by means of a forked lever 46, the latter being mounted to move with the adjacent axle 13 and having a connection with the disk, thereby to move the same into and out of engagement with the gear 14. It is to be understood that the forked levers 46 may be operated independently or in unison, as may be desired. The brake members 45 may be set when descending grade or when it is required to quickly bring the machine to rest in an emergency or as may be required.

A brake shaft 47 is mounted upon the longitudinal bars 1 and is supplied with brake shoes 48 which are adapted to be brought into engagement with the drive wheels 5 to control the speed of the machine in the well known manner. The brake shaft 47 has an arm 49 which is connected by means of a rod 50 with a lever 51 accessible to the operator to admit of application of the brakes when desired. Scrapers 52 are provided for keeping the grooves 15 of the gear wheels 14 free from mud or other foreign matter. These scrapers 52 are attached to arms 53 projected upward from the arches 11.

Having thus described the invention, what is claimed as new is:

1. In vehicle drive gear of the character specified the combination of a traction drive wheel, a gear wheel coöperating therewith and having an annular groove adapted to receive the rim of said drive wheel, an axle of substantially T form carrying said gear wheel and pivotally mounted by means of its cross head, means for imparting movement to the gear wheel, and means for moving the axle about its cross head to throw the grooved face of the gear wheel into and out of engagement with the drive wheel.

2. In vehicle drive gear of the character set forth, the combination with a supporting frame and traction wheel, an auxiliary frame carried by the supporting frame and spaced laterally from the drive wheel, an axle having one end pivotally mounted on the auxiliary frame, a gear wheel carried by the opposite end of the pivoted axle and having a grooved face for contact with the rim of the drive wheel, means for imparting movement to the gear wheel, and means for moving the axle to throw the grooved face of the gear wheel into and out of engagement with the rim of the drive wheel.

3. In vehicle drive gear of the character set forth, the combination of a drive wheel, a gear wheel having a grooved portion to receive the rim of the drive wheel and provided with a toothed portion, a movable mounting for said gear wheel, a shaft, a gear wheel fast to said shaft and adapted to mesh with the first mentioned gear wheel, and means for imparting movement to said shaft.

4. In vehicle drive gear of the character set forth comprising an axle provided with drive wheels, short axles arranged approximately parallel with the main axle and pivotally mounted at their inner ends, gear wheels mounted loosely upon the outer ends of the short axles and adapted to engage frictionally with the drive wheels, means for imparting positive movement to said gear wheels, means for moving the outer ends of the short axles to bring the gear wheels into and out of engagement with the drive wheels, disks loosely mounted upon the outer portions of said short axles and levers mounted to move with said short axles and having connection with said disks to move them into and out of engagement with said gear wheels.

5. In vehicle drive gear of the character specified comprising drive wheels, short axles arranged approximately parallel with the axle of said drive wheels and pivotally mounted at their inner ends, gear wheels loosely mounted upon the outer portions of the short axles, means for moving the outer ends of the short axles to throw the gear wheels into and out of engagement with said drive wheels, longitudinal shafts geared at one end to the gear wheels at the outer ends of the short axles, a drive shaft provided with friction wheels, friction gears slidably mounted on the longitudinal shafts remote from the ends geared to the short axles, means for moving the friction wheels upon the longitudinal shafts and other means for moving the longitudinal shafts toward and from the drive shaft to bring the friction gears into and out of engagement with the friction wheels.

6. In combination an axle provided with drive wheels, short axles paralleling the main axle and pivotally mounted at their inner ends, gear wheels loose upon the outer ends of the short axles and adapted to engage with the drive wheels, means for moving the outer ends of the short axles toward and from the main axle to bring the gear wheels carried thereby into and out of engagement with the drive wheels, longitudinal shafts inclined forwardly and downwardly and geared at their upper rear ends to the said gear wheels, friction gears mounted upon the lower forward end of the longitudinal shafts to move thereon and to turn therewith, a drive shaft, friction wheels mounted upon said drive shaft and adapted to coöperate with said friction gears, means for moving the lower forward ends of the longitudinal shafts laterally, and means for moving the friction gears upon the longitudinal shafts and securing the same in the adjusted position.

In testimony whereof I affix my signature in presence of two witnesses.

WILLIAM N. THURMAN.

Witnesses:
   JOHN R. TARRANT,
   ENOCH L. RAGSDALE.